United States Patent

Mattsson et al.

(10) Patent No.: US 9,648,011 B1
(45) Date of Patent: May 9, 2017

(54) TOKENIZATION-DRIVEN PASSWORD GENERATION

(71) Applicant: Protegrity Corporation, Grand Cayman OT (KY)

(72) Inventors: Ulf Mattsson, Cos Cob, CT (US); Yigal Rozenberg, Wilton, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

(21) Appl. No.: 13/762,746

(22) Filed: Feb. 8, 2013

Related U.S. Application Data

(60) Provisional application No. 61/597,595, filed on Feb. 10, 2012.

(51) Int. Cl.
*G06F 7/04* (2006.01)
*H04L 29/06* (2006.01)
*G06F 15/16* (2006.01)

(52) U.S. Cl.
CPC ................... *H04L 63/083* (2013.01)

(58) Field of Classification Search
CPC .......... G06F 21/6245; G06F 17/30985; G06F 17/30339; G06F 17/30424; G06F 21/6254; H04L 2209/56; H04L 63/0428; H04L 9/083; H04L 9/0897; H04L 63/06
USPC ................. 726/6, 26; 707/802, E17.04, 763; 709/219
See application file for complete search history.

(56) References Cited

U.S. PATENT DOCUMENTS

| 5,577,249 | A | * | 11/1996 | Califano | ........... G06F 17/30985 |
| | | | | | 382/209 |
| 7,120,933 | B2 | | 10/2006 | Mattsson | |
| 7,305,707 | B2 | | 12/2007 | Mattsson | |
| 8,458,487 | B1 | * | 6/2013 | Palgon et al. | ................ 713/185 |
| 8,769,607 | B1 | * | 7/2014 | Jerdonek | ................ G06F 21/31 |
| | | | | | 726/1 |
| 2003/0131266 | A1 | * | 7/2003 | Best et al. | .................... 713/202 |
| 2003/0163737 | A1 | * | 8/2003 | Roskind | ................. G06F 21/31 |
| | | | | | 726/6 |

(Continued)

OTHER PUBLICATIONS

Computer Security—ESORICS 2010 Lecture Notes in Computer Science vol. 6345, 2010, pp. 286-302 Kamouflage: Loss-Resistant Password Management.*

(Continued)

*Primary Examiner* — Gary Gracia
(74) *Attorney, Agent, or Firm* — Fenwick & West LLP

(57) ABSTRACT

Applications usually require users to present passwords as a form of identification in order to access user accounts. To improve the security and convenience for accessing such accounts, tokenized passwords may be used in place of or in addition to traditional passwords. Client devices retrieve password rules from an application associated with the user account, and retrieve token tables based on the password rules. The client device receives information from the user for use as a password seed. Using the password seed as an input to the token tables, the client device generates a tokenized password. The tokenized password is transmitted to the application for association with the user account. The tokenized password is not saved at the client device but is re-generated each time the user accesses the account, improving the security of the token-driven password generation system.

15 Claims, 3 Drawing Sheets

(56) References Cited

U.S. PATENT DOCUMENTS

| | | | |
|---|---|---|---|
| 2004/0054535 A1* | 3/2004 | Mackie | G10L 13/08 704/260 |
| 2004/0073815 A1* | 4/2004 | Sanai et al. | 713/202 |
| 2005/0050322 A1* | 3/2005 | Mizrah | H04L 9/0822 713/168 |
| 2005/0071645 A1* | 3/2005 | Girouard | G06F 21/31 713/183 |
| 2006/0271789 A1* | 11/2006 | Satomura et al. | 713/183 |
| 2007/0198421 A1* | 8/2007 | Muller | G06F 21/10 705/52 |
| 2008/0082834 A1 | 4/2008 | Mattsson | |
| 2008/0181403 A1* | 7/2008 | Sakamoto | 380/258 |
| 2009/0125994 A1* | 5/2009 | Fischer | G09C 1/00 726/6 |
| 2009/0150677 A1* | 6/2009 | Vedula et al. | 713/183 |
| 2009/0150991 A1* | 6/2009 | Hoey | G06F 21/33 726/18 |
| 2009/0158406 A1* | 6/2009 | Jancula | G06F 21/46 726/5 |
| 2009/0249082 A1* | 10/2009 | Mattsson | G06F 21/6218 713/193 |
| 2009/0288143 A1* | 11/2009 | Stebila | G06F 21/445 726/3 |
| 2009/0300715 A1* | 12/2009 | Ahn | G06F 21/34 726/1 |
| 2009/0313696 A1* | 12/2009 | Himberger et al. | 726/22 |
| 2010/0011409 A1* | 1/2010 | Hodgkinson | G06F 21/31 726/1 |
| 2010/0031343 A1* | 2/2010 | Childress et al. | 726/18 |
| 2010/0208888 A1* | 8/2010 | Weber | 380/44 |
| 2010/0257145 A1* | 10/2010 | Felsheim | G06F 17/30563 707/692 |
| 2010/0318807 A1* | 12/2010 | Wang | G06F 21/31 713/184 |
| 2011/0041053 A1* | 2/2011 | Liang et al. | 715/234 |
| 2011/0126274 A1* | 5/2011 | Sadeckas | G06F 21/335 726/7 |
| 2011/0211689 A1* | 9/2011 | von Mueller | G06Q 20/085 380/28 |
| 2011/0213807 A1* | 9/2011 | Mattsson | G06F 21/6245 707/802 |
| 2011/0277021 A1* | 11/2011 | Ogawa | 726/6 |
| 2011/0307714 A1* | 12/2011 | Comrie | G06F 21/6209 713/189 |
| 2011/0314294 A1* | 12/2011 | McGrew et al. | 713/182 |
| 2011/0314532 A1* | 12/2011 | Austin | H04L 9/3213 726/8 |
| 2012/0005740 A1* | 1/2012 | Wurth | H04L 63/0869 726/9 |
| 2012/0066650 A1* | 3/2012 | Tirpak | G06F 21/46 715/863 |
| 2012/0110634 A1* | 5/2012 | Jakobsson | 726/1 |
| 2012/0137131 A1* | 5/2012 | Lu | H04L 9/3228 713/168 |
| 2012/0180124 A1* | 7/2012 | Dallas et al. | 726/22 |
| 2012/0240211 A1* | 9/2012 | Counterman | H04L 9/321 726/9 |
| 2013/0054605 A1* | 2/2013 | Yeh et al. | 707/740 |
| 2013/0060780 A1* | 3/2013 | Lahiri et al. | 707/741 |
| 2013/0103685 A1 | 4/2013 | Preneel et al. | |
| 2013/0103949 A1* | 4/2013 | Lund | 713/184 |

OTHER PUBLICATIONS

Mattsson, U.T., "Format-Controlling Encryption Using Datatype-Preserving Encryption," National Institute of Standards and Technology, Dec. 5, 2012, pp. 1-46, can be retrieved at <http://csrc.nist.gov/groups/ST/toolkit/BCM/documents/proposedmodes/fcem/fcem-spec.pdf>.

McCallister, E., et al., "Guide to Protecting the Confidentiality of Personally Identifiable Information (PII)", National Institute of Standards and Technology, U.S. Department of Commerce, Jan. 2009, pp. 1-58, can be retrieved at <http://csrc.nist.gov/puplications/PubsSPs.html>.

* cited by examiner

TOKENIZATION-DRIVEN PASSWORD GENERATION

CROSS REFERENCE TO RELATED APPLICATIONS

The application claims the benefit of Provisional Application No. 61/597,595 filed on Feb. 10, 2012, which is incorporated herein by reference.

FIELD OF ART

This application relates to the field of password management, and more specifically to the management of passwords generated by tokenization.

BACKGROUND

Many websites, services, and applications require users to register a password with the website/service/application as a security measure for user authentication. For example, users register passwords with email providers, banks, online markets, credit card companies, computer systems, social networks, and the like. To minimize the number of passwords that a user has to maintain, users often choose to re-use the same password for multiple accounts on different websites, applications, and services. However, if a malicious individual gains knowledge of the password for one of the user's accounts, then several of the user's accounts may be compromised. Furthermore, users may register weak passwords, such as passwords based on a special date, a name, a specific sequence of numbers, a mnemonic device, a key phrase, and the like. In this case, malicious individuals may determine a user's password by various brute force methods.

The user may take steps to protect against such an event, such as creating complex passwords, registering different passwords for each account, using password managers, and so forth. Each of these methods has downsides, which can create difficulties for the user or vulnerabilities in the user's account security. While complex passwords may be difficult for malicious individuals to determine, users themselves may have difficulty remembering such passwords. A user may register different complex passwords for different accounts, but this compounds the difficulty of remembering all of the passwords, and remembering which account each to which each password corresponds. Password managers can store all of a user's passwords, but storing passwords comes with the risk that malicious individuals may hack into the password manager and obtain all of the user's passwords.

SUMMARY

A client device uses user-provided information and token tables to generate passwords for various user accounts. The user-provided information, referred to herein as a "password seed", is used as an input to one or more token tables to generate a tokenized password. The client device, such as a computer, smart phone, website, web server, and the like, contains one or more token tables that are received from a security system. These token tables may be updated or replaced periodically by the security system based on various conditions, such as specific time intervals, user requests, or security rules. In an embodiment, the tokenized passwords described herein are implemented within a client device in the form of a plug-in or an application that executes in the background and monitors user inputs.

In one embodiment, in response to a user accessing a website, service, application or the like (collectively referred to as "application" henceforth), that requires the user to register an account with a new (or replacement) password, the client device generates a tokenized password that is more secure than a user-generated password. The application may also require that a user input a combination of a user-provided password and a tokenized password into the application in order to access an account, in which case the client device prompts the user to provide the necessary information and generates the tokenized password. As used herein, "tokenized password" and "tokenization-based password" are used to refer to tokenized data used as a password. The client device can communicate with the application to determine specific password requirements (hereinafter "password rules"), such as password length, character requirements (e.g., letter case, digits, symbols, spacing and so forth), or sequence requirements (e.g., letter/number ordering). The client device generates tokenized passwords according to these password requirements.

The client device accesses and uses a password seed in generating a tokenized password. The password seed can include information that the user explicitly provides to the client device (e.g., a phrase, a password, a URL, a website, a user account number or identifier, a user identity, a text string, a mnemonic device, various numbers associated with the user, and so forth) in response to a password generation request. For example, the client device can request the user to provide a keyword or short phrase (such as "bank account" or "email"), a website or URL (such as www-.bankaccount.com or www.wikipedia.org), or the name of a service (such as "Netflix"). The user can provide information associated with an account that does not necessarily identify an account. For example, a user can associate any keyword or term they desire, whether as a mnemonic term (e.g., "money" with the user's bank account at a bank website), or an entirely arbitrary term (e.g., "elephant" with the user's cloud-stored documents on web based storage system). This information can be used as the password seed for generating a tokenized password. Instead of having to memorize complex passwords as traditional accounts require, users can memorize an easy password which is automatically converted into an opaque tokenized password that is resistant to brute force attacks.

The client device can also collect a password seed without explicitly requesting the user to input the password seed. For example, the client device can analyze client device properties, network connection properties, network browser client properties, stored cookies, system security properties, or any other information associated with the user that can be used in generating a tokenized password, which is useful to limiting account access under certain conditions. Once selected, the source of the password seed should be invariant over time, in order to generate the same tokenized password with a given set of token tables, without having to store the password locally on the client device. In addition to knowing explicitly provided information for the password seed, users can also need to fulfill other conditions in order to gain account access. For example, time could be used to restrict account access to certain times of day (e.g., based on the hour digit). Location could also be used to limit access to when a user is in a specific state or country, which is useful for both travelers and non-travelers. Such information can be used as part of the password seed used to generate a tokenized password.

The client device generates a tokenized password by tokenizing the password seed using one or more token tables. In embodiments where an application programming interface (API) is used by the client device to retrieve password rules, the client device selects specific token tables that map input values to tokens that satisfy the retrieved password rules. The client device then interfaces with the application and registers the tokenized password for a user account. Alternatively, some applications may not have the capability to automatically interface with the password generator of the client device. In such instances, the client device can provide the user with the tokenized password, and the user can register the tokenized password with the application. If the tokenized password fails to satisfy the password rules, then the client device can iteratively generate new tokenized passwords using different sets of token tables until a tokenized password is generated that satisfies the password rules.

Each subsequent time the user wants to access an account, the user provides the same password seed first used to generate the tokenized password for the account. The client device tokenizes the password seed using the same token tables initially used to generate the password in order to re-generate the tokenized password. The tokenized password is then provided to the application. Unlike a typical password manager, the token-based passwords are not stored locally on the client device, but are re-generated each time the user wishes to access an account. By re-generating the token-based passwords, the client device eliminates the potential security vulnerability presented by the storage of passwords in a password manager. As long as the client device maintains access to the token tables used to generate the tokenized password, tokenizing the password seed will result in the generation of the correct tokenized password each time the tokenized password is requested. If a client device's token tables are updated, the client device can prompt the user to register a new tokenized password with the application, or can automatically register a new tokenized password with the application.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
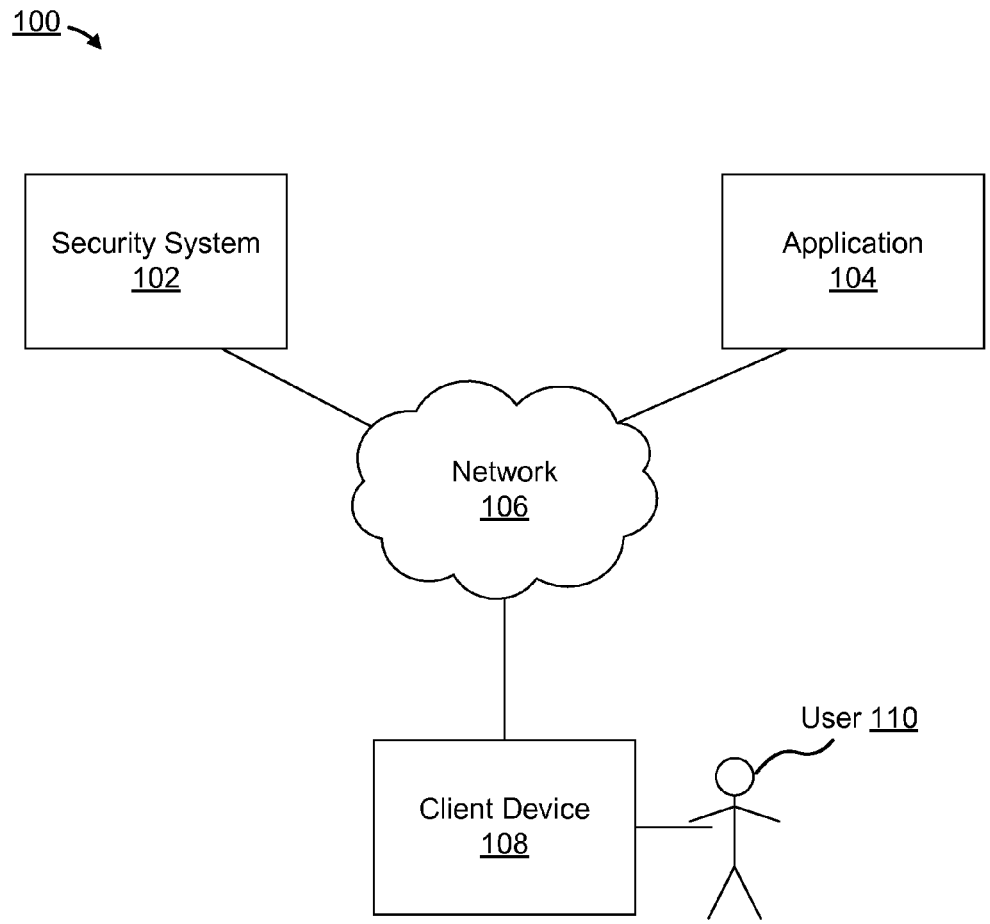
FIG. 1 is a system environment diagram for a tokenized password generation system, in accordance with an embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Tokenization Overview

The transmission and storage of sensitive data, such as passwords, credit card numbers, social security numbers, bank account numbers, driving license numbers, etc, is oftentimes challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token table entry is generated each time sensitive data is tokenized. A seed value can be used to generate each DLT. In some embodiments, the sensitive data or portions of the sensitive data can be used as a seed value to generate a DLT. DLTs can in some configurations provide a higher level of security compared to SLT but require the storage and/or transmission of a large amount of data associated with each of the generated token tables. While DLT tokenization can be used to tokenize data according to the principles described herein, the remainder of the description will be limited to instances of SLT tokenization for the purposes of simplicity.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

Tokenized Password Generation Overview

FIG. 1 is a system environment diagram for a tokenized password generation system, in accordance with an embodiment. The environment 100 of FIG. 1 includes a security system 102, an application 104, and a client device 108, communicatively coupled through a connecting network 106. Furthermore, a user 110 uses the client device 108 to access the network 106 and its connected modules. Other embodiments of the system environment may contain different and/or additional components than those shown by FIG. 1.

The client device 108 is a computing device capable of processing data as well as transmitting data to and receiving data from the other modules in the system environment 100 via the network 106. For example, the client device 108 can be a desktop computer, laptop computer, smart phone, tablet computing device, server, payment terminal, or any other device having computing and data communication capabilities. Each device includes one or more processors, memory, storage, and networking components. The client device 108 is coupled to the network 106 and can interact with other modules coupled to the network 106 using software such as a web browser or other application with communication functionality. Such software can include an interface for communicating with the other modules via the network 106. In some embodiments of the system environment 100, there can be any number of the client devices 108, security systems 102, and applications 104 connected to the network 106 and communicating with one or more other modules.

The network 106 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network 106 can also be a combination of multiple different networks.

A security system 102 is connected to the network 106 and is configured to generate and/or maintain a plurality of token tables for use by the application 104 and the client device 108. For example, the security system 102 can generate and transmit token tables to the client device 108 for password tokenization operations. The security system 102 distributes the token tables to the client device 108 for storage. If the token tables stored by the client device 108 meet certain conditions that require them to be updated (e.g., they are outdated or compromised, an update request is received from the user 110, a periodic token table update is due, and the like), then the security system 102 generates new token tables or accesses additional token tables and provides the new token tables to update or replace the existing token tables at the client device 108. The security system 102 can also remove existing token tables on client device 108, particularly from devices that have security-compromised token tables.

In some embodiments, the security system 102 can also be configured to control or maintain other security measures for the application 104 and/or the client device 108, such as encryption algorithms, initialization vector tables, public/private keys, encoding operations and so forth. Security system 102 can generate and/or update existing measures at the application 104 or the client device 108 in response to specific conditions. These conditions can include outdated algorithms, compromised algorithms, user-initiated updates, automatic periodic updates, and so forth. The security system 102 exposes an application programming interface by which client devices 108 and applications 104 can invoke the foregoing functions and operations.

The application 104 can be any website, service, or application that requests or requires that the user 110 register a password in order to provide a form of identity verification for accessing an account at the application 104. For example, the application 104 can be a bank terminal, shopping website, company portal, government application, email provider, server, VPN access portal, social network, communication client, and other similar services. The application 104 can contain one or more accounts associated with user 110. In an embodiment, an API is used by the application 104 that allows the application 104 to interface with the client device 108. Through the API, the application 104 can communicate password rules, error responses, command responses, application information, and the like to the client device 108. For each account, the application 104 can request and receive a password from the client device 108 for the account, and can store the received password in associated with the account.

Upon receiving a request from the client device 108 to subsequently access an account, the application can request the password associated with the account from the client device 108. In response to the request, the client device generates a tokenized password using locally stored token tables, and passes the generated password to the application. If the received password is the same as the stored password associated with the account, the application 104 provides access to the account to the client device 108. In an embodiment of the environment 100, the application 104 can be configured to communicate automatically with the client device 108 to request and receive tokenized passwords from the client device 108 without user intervention. Alternatively, the application 104 can be configured to request that the user 110 input a tokenized password associated with a requested account.

Tokenization and Password Generation

Figure 2:
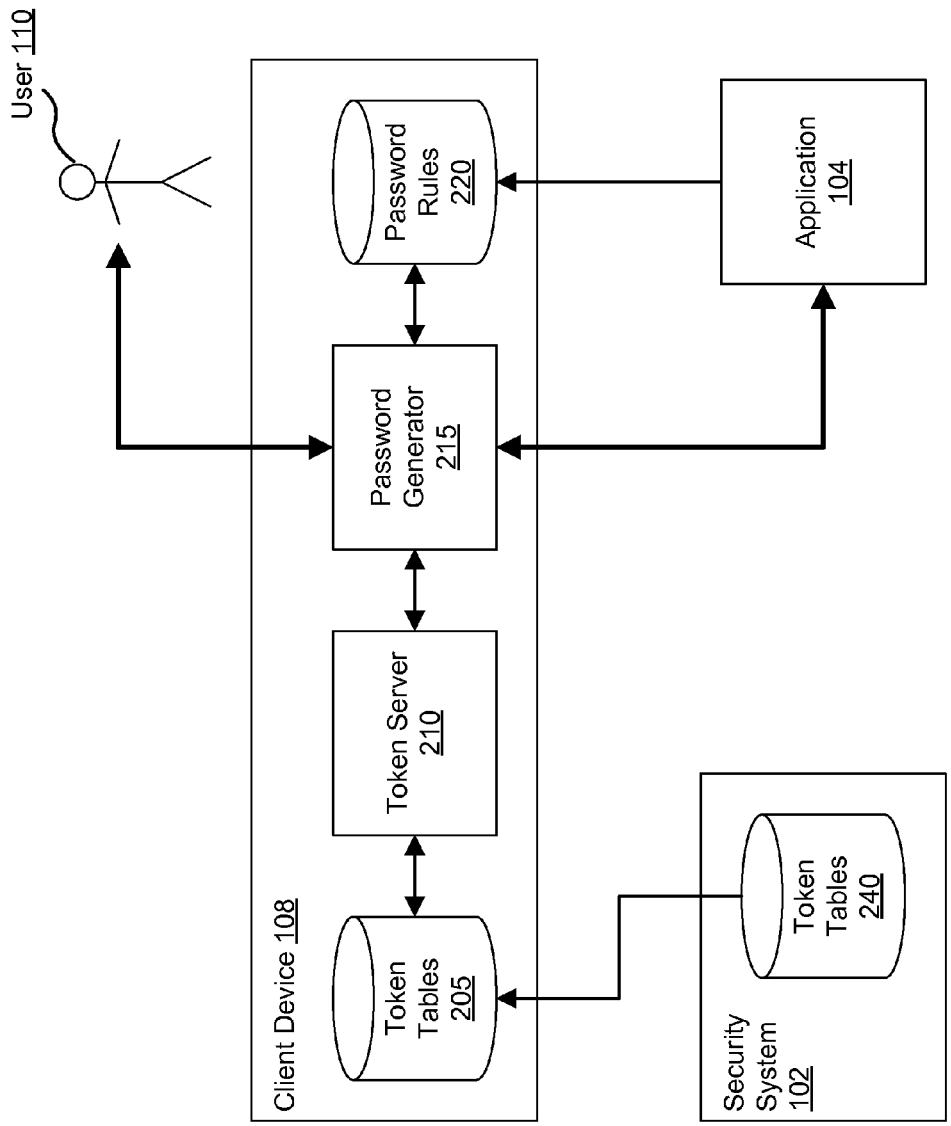
FIG. 2 illustrates a tokenized password generation environment, in accordance with an embodiment.

FIG. 2 illustrates a tokenized password generation environment, in accordance with an embodiment. The environment of FIG. 2 includes a client device 108, a security system 102, and an application 104, as described with respect to FIG. 1. Other embodiments of the environment can include different and/or additional components than those shown by FIG. 2. Furthermore, the components of the environment shown in FIG. 2 communicate through the network 106 (not shown).

As mentioned in FIG. 1, the security system 102 generates and maintains various security measures for the client device 108 and the application 104. These security measures include token tables, encryption algorithms, initialization vector tables, encoding operations, and so forth, as described, for example, in U.S. patent application Ser. No. 13/595,438, filed Aug. 27, 2012, which is incorporated by reference herein. The security system 102 includes a token tables database 240. The security system 102 generates and stores token tables in the token tables database 240, for instance in response to a request for token tables from the client device 108, or for periodic replacement of token tables stored at the client device 108. Token tables can be generated prior to, or in response to, requests by a client device 108 for token tables. The security system 102 can retrieve token tables from the token tables database 240 and send them to a client device 108, for example, in response to certain conditions (e.g., the elapsing of periodic time intervals, the receipt of user requests, security vulnerabilities, and so forth).

In various embodiments, a security system 102 includes other modules and databases implementing and monitoring security at the client device 108 and/or the application 104. For example, the security system 102 can include modules such as an initialization vector database, initialization vector generator, encryption algorithm database, and so forth. In addition, while the communication shown between the security system 102 and the client device 108 is shown to be one-directional in FIG. 2, other embodiments can utilize a two-directional communication scheme. For example, a client device 108 can actively request the security system 102 to provide updated token tables or can notify the security system 102 of a security breach.

As noted above, an application 104 can be any website, service, or application that requests a user 110 to register or input a password in order to access an account saved on the application 104. For example, when a user 110 signs up for an account on a social network website, e-commerce website, financial services website, or the like, the website requests that the user 110 create a password that becomes associated with the account. In order to subsequently access the account, the user 110 has to input the correct password. When the user inputs an incorrect password, the website blocks access to the account until the correct password is entered. An application 104 can be configured to accept tokenized passwords that a user manually inputs, or it can be configured to automatically communicate with a client device 108 to request and receive a tokenized passwords.

The application 104 can enforce certain password format rules in order to encourage the use of strong passwords. Typical password format rules include a minimum number of characters, a maximum number of characters, certain types of characters (e.g., letters, letter casings, numbers, symbols and the like), and/or certain character sequencing (e.g., password beginning with a letter, password alternating letters and other types of characters, password having a limited number of character repetition and so forth). These password format rules can be transmitted from the application 104 to the client device 108 and saved in a password restrictions database 220, discussed below in greater detail. In embodiments where an API is used by the application 104 to communicate with client device 108, the application 104 can automatically transmit password rules without user input. In other embodiments where such an API does not exist, the user 110 can manually enter an application's password rules into client device 108, using a supplied syntax. The application 104 can be configured to periodically or immediately update the password rules database 220 with new password rules as they are updated or changed.

In the embodiment of FIG. 2, the client device 108 includes a token tables storage module 205, a token server 210, a password generator 215, and a password rules storage module 220. Other embodiments of the client device 108 can contain different and/or additional components than those shown by FIG. 2. The client device 108 acts as an interface between a user 110 and an application 104, allowing the user 110 to access the application 104. The client device 108 communicates with the security system 102 and the application 104 through a network 106 (not shown).

The token tables database 205 stores token tables received from the security system 102. These token tables can remain stored for an indefinite amount of time or can be updated/removed periodically by the security system 102. Each stored token table can be associated with a different level of complexity. For example, a token table with tokens consisting of entirely lower case letters can be associated with a low level of token complexity, a token table with tokens consisting of a mix of lower and upper case letters can be associated with a medium level of complexity, and token tables with tokens consisting of numbers, symbols, lower case letters, and upper case letters can be associated with a high level of complexity. When requested by a token server 210, the token tables database 205 retrieves one or more token tables based on the received password rules, or based on a requested level of complexity and transfers the token tables to the password generator 215 for use in tokenizing data. The database 205 stores information mapping each token table with one or more applications for which the token table is used for generating tokenized passwords.

The token server 210 receives requests for token tables stored in the token tables storage module 205, retrieves the token tables that satisfy the password rules or requested complexity level, and provides the retrieved token tables to the password generator 215. For example, when a user 110 enters information into the client device 108 in order to access an account at an application 104, the password generator 215 prompts the token server 210 for token tables associated with the account, passing to the token server 210 information identifying the application 104. The token server 210 responds by retrieving the appropriate token tables associated with the application 104 that satisfy the password rules or requested complexity level from the token tables database 205 and transfers them to the password generator 215. Furthermore, the token server 210 can monitor the viability or strength of the stored token tables. For example, if the token server 210 determines that one or more token tables are outdated or have been compromised, it can automatically block usage of the affected token tables and prompt the security system 102 to update the token tables. In such a case, it can also prompt the password generator 215 to create and/or update one or more tokenized passwords associated with the affected token tables so that the tokenized passwords instead correspond to the updated token tables. The user 110 initially registers a tokenized password with a requested account at the application 104 in advance. For example, during the setting up of an account, or upon updating a password for an account, the application 104 associated with the account can prompt a user to provide a password. The remainder of the description will be limited to embodiments in which the user 110 creates and requests passwords for an account at the application 104 via the client device 108, though in other embodiments, the user 110 can directly interface with the application 104 to create and provide passwords for accounts at the application 104. In response to the receipt of a password request for an account at the client device 108, the password generator 215 generates a tokenized password for use with the account.

In an embodiment, the disclosed invention is implemented on the client device 108 as plug-in software or as an installed program configured to generate tokenized passwords (hereinafter "password application"). The password application identifies when an application or website requires a password to be entered or changed (for example, by detecting password tags/fields in a website's program code). The password application can also include protocols allowing it to interface with the application 104. By interfacing with the application 104, the password application allows the client device 108 to retrieve password rules, request password changes, determine password registration success/failure, receive instructions or updated protocols, and so forth. In an embodiment, the password application can be visible on an operating system as an icon or taskbar symbol. The password application can be programmed to communicate with other programs running on the operating system that accesses user accounts. In another embodiment, the password application can be installed as a plug-in on other software, such as Internet browsing clients. When the browsing client accesses a site that allows users to access user accounts, the plug-in can automatically recognize the website and provide the appropriate interface and user choices.

To generate a tokenized password, the password generator 215 prompts the user 110 to provide information as a password seed that will be used to generate a tokenized password. The password generator 215 can prompt a user 110 to provide various information associated with the account. Alternatively, the password generator 215 can automatically obtain the password seed from some aspects of the state of the client device, which aspects are invariant over the time period for which the generated password is expected or required to be valid. Upon receiving a password seed associated with the account, the password generator 215 requests one or more token tables associated with the account from the token server 210. In one embodiment, the password generator 215 requests token tables based on the received password seed. In an embodiment, the token server 210 can retrieve specific token tables that will generate tokenized passwords that satisfy the password rules. In another embodiment, the token server 210 can retrieve token tables based on the level of security needed by the application 104. The password generator 215 generates a tokenized password by tokenizing the password seed associated with the account with the one or more token tables associated with the account. The password seed is not stored on the client device.

The received password seed associated with a requested account can be tokenized in whole or in part, and various portions of the password seed can be tokenized using different token tables. In addition, one portion of the received password seed can be used to modify or encrypt another portion of the password seed before or after tokenization. For instance, the password generator 215 can use the first half of an inputted key phrase as a seed for selecting a specific set of token tables to use in tokenizing the second half of the inputted key phrase to generate the tokenized password. Likewise, a portion of the password seed can be used as an IV or as an encryption key to modify a second portion of the password seed before tokenization. For example, a user 110 can input a key phrase "thefirstlawofrobotics", and the password generator 215 can use the last two characters ("cs") as an initialization vector that modifies the rest of the phrase before tokenization. In some embodiments, the password generator 215 can use chained tokenization to generate a tokenized password. For example, the password generator 215 can use the password seed to generate an intermediate tokenized password with a first set of token tables, and can generate a final tokenized password by tokenizing the intermediate tokenized password with a second set of token tables.

In an embodiment where the application 104 includes an API that allows the application 104 and the client device to communicate with each other, the password generator 215 can retrieve a set of password rules associated with the requested account and with the application 104 from the password rules database 220. For example, the retrieved password rules can require passwords for the requested account have a combination of lower-case letters, upper-case letters, numbers, and symbols. The password rules can be transmitted to the password rules database 220 when the user 110 first uses the client device 108 to access the application 104, and the rules can be updated each time the user 110 subsequently accesses the application 104. In embodiments where the application does not include an API, the client device 108 may prompt the user to input the set of password rules for the application 104. The token server 210 retrieves token tables that map input values to tokens that each individually satisfy the password rules. In instances where the password rules are not known, token server 210 can retrieve token tables associated with a requested level of complexity. For example, a low level complexity password can include all lowercase letters while a high level complexity password can include letters, numbers, and symbols.

In an example embodiment in which password rules are not known to the password generator 215, the token server 210 can retrieve a low complexity level token table, and the password generator 215 can generated a tokenized password using the low complexity level token table. The tokenized password generated from the low complexity level token tables can be provided to the application 104, and if the application 104 rejects the password for not satisfying the application's password rules, the token server 210 can retrieve a higher complexity level token table and the password generator 215 can generate a new tokenized password based on the retrieved higher complexity level token table. This cycle can be repeated with iteratively higher complexity level token tables until a tokenized password is generated that is accepted by the application 104.

The password generator 215 can be configured so that upon generating a tokenized password that satisfies retrieved password rules, the password generator 215 automatically transmits the tokenized password to an application 104 for registering with a user's account, without further user 110 actions. For example, a client side browser plug-in can monitor and identify which applications 104 the user 110 is currently accessing. When the plug-in detects that the current application 104 that requires a password, the plug-in can automatically notify the password generator 215 to prompt the user 110 for the password seed. However, some applications 104 may not have an API to receive such automated communication from the password generator 215, or the password generator 215 may not be configured to automatically transmit the tokenized password. In such instances, the password generator 215 can display the tokenized password to the user 110 and the user 110 can manually input the tokenized password into the application 104.

At a subsequent time, a user will need access to the application 104. When the user accesses the application 104 at this later point, the application 104 will require input of the user's password. The password generator 215, in response to receiving a request to access the account from the user 110, can prompt a user to provide the password seed used to generate a tokenized password for the account, and the user 110 can provide the requested information. The password generator 215 then accesses the one or more token tables associated with the application 104 and used to generate the tokenized password for the account, and tokenizes the password seed using the accessed token tables to generate the tokenized password. The tokenized password is then provided to the application 104, and the user 110 is granted access to the account.

Unlike a general password manager, the tokenized passwords used for a user's various accounts are not stored locally on the client device 108, but instead are re-generated each time the user wishes to access an account. This process of re-generating the tokenized password eliminates the potential security vulnerability presented by the storage of passwords in a password manager, cookies, or other repository on the client device. As long as the token tables used to initially generate a tokenized password remain accessible to the client device 108, the password seed used to generate tokenized passwords will result in the generation of the same tokenized password each time the same password seed is tokenized using the token tables. In the event that the client device loses access to the token tables, the client device 108 can request the token tables from the security system 102.

Example Embodiment

In an example embodiment, a user 110 signs up for an online banking account with the website "www.bankaccount.com". During the process of signing up for the account, the user 110 is asked to enter a password to register with the account. The website uses the following password rules:
  Minimum length=8
  Minimum 1 lower case letter
  Minimum 1 upper case letter
  Minimum 1 digit
  Password must begin with a letter In an embodiment where an API provides an interface between the client device 108 and the website, the client device 108 can directly retrieve these password rules from the website. Otherwise, the user 110 can manually input the password rules into the password application through a user interface. The client device 108 then prompts the user 110 to provide information as the password seed. The user 110 provides a phrase (e.g., "bank account") to the client device 108. The client device 108 can retrieve one or more token tables based on the retrieved password rules, and can query the token tables with the string "bank account", producing the tokenized string "ajkT13jhDLAv". The generated string "ajkT13jhDLAv" satisfies the website's password rules and is either transmitted automatically to the website for associating with the user's new account or displayed to the user for manual entry into the website.

On subsequent visits to the same website, the user is prompted by the client device 108 to re-enter the same phrase as when the tokenized password was registered ("bank account"). The client device 108 also retrieves the same token tables that were used initially during the earlier registration process. Using the same phrase and the same token tables, client device 108 is able to generate the same tokenized password "ajkT13jhDLAv". The user 110 is then able to use the tokenized password to log onto an account on the bank website. Alternatively, the client device 108 can automatically transmit the tokenized password directly to the bank website during the password registration or account access period, thus reducing the inputs required from the user 110.

In another example embodiment, a user 110 attempts to change the password "Ush411N0tp455" on a different bank website that does not make password rules publically available. When the client device 108 prompts the user 110 for a password seed, the user 110 can associate the phrase "lots of money" with the user account at the bank website. Since the client device 108 does not have the set of password rules from the website, the client device 108 can retrieve low complexity level token tables for generating a tokenized password. The client device 108 uses this user's phrase to generate "SlfswFkLvm". The bank website can reject this tokenized password because it does not satisfy its unstated password rules, which can be inferred to require at least one digit. In response, the client device 108 can retrieve higher complexity level token tables that generate token digits, and re-generate a tokenized password based on the original input phrase. Using the newly retrieved token tables and the original phrase, the client device 108 can generate the tokenized password "K1d5reXp3n51V3", which the bank website accepts as a valid password, confirming the requirement of at least one digit. The new tokenized password can then be successfully registered with the bank website. Furthermore, the client device 108 associates the higher complexity level token table with the bank website. During subsequent visits to the bank website, the user 110 can enter the same phrase ("lots of money") and the client device 108 retrieves the same higher complexity level token table as during the previous visit in order for the client device 108 to re-generate "K1d5reXp3n51V3", which is then transmitted to the bank website for account access.

Tokenized Password Generation

Figure 3:
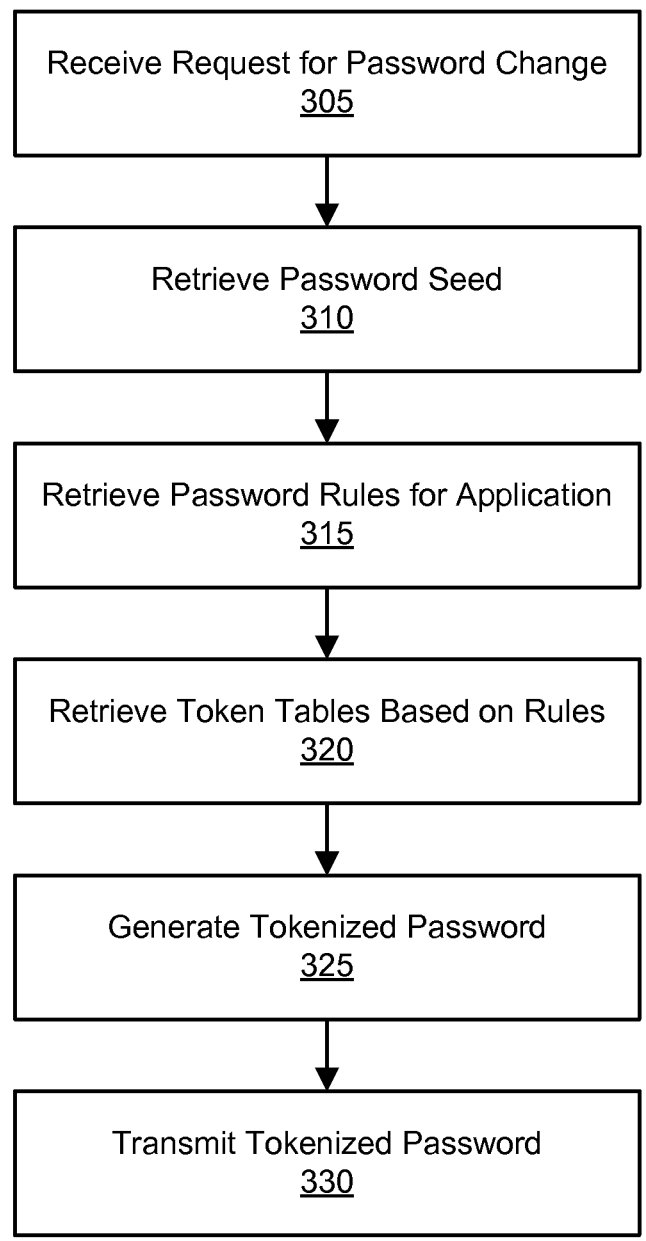
FIG. 3 is a data flow diagram for a tokenized password generation operation, in accordance with an embodiment.

FIG. 3 is a data flow diagram for a tokenized password generation operation, in accordance with an embodiment. The process is initiated when a password application receives 305 a request for a password change. The request for a password change can be initiated when a user 110 wants to register a new password associated with an account on an application 104, update/change an existing password for an account on the application 104, or access an existing account on the application 104. Client device 108 receives 310 a password seed from the user 110. The password seed, as noted above, can be retrieved by prompting the user to input information (such as a password phrase or account nickname) through a user interface, by retrieving information previously saved and available in storage, by retrieving system properties from the client device 108, or any combination herein. It is noted that the password seed originates from information that stays constant. The password seed is used as an input to token tables for generating a tokenized password. In some embodiments, the password seed is also used as a seed value for selecting or modifying an encoding method. In embodiments where the application 104 implements an API capable of communicating directly with the client device 108, the client device 108 retrieves 315 password rules from the application 104 in order to determine the password formatting requirements for the application 104. In other embodiments where the application 104 does not have an API capable of communicating with the client device 108, the client device 108 can prompt the user 110 to manually input the password rules from the application 108. For example, the application 104 may have a specific section or page indicating what its password formatting rules are. The user 110 can read the password rules and manually input them into entry boxes provided through a user interface by the password application on client device 108. It should be noted that in some embodiments, the client device 108 may already have password rules for the application 104 stored from a previous password rules retrieval. In this instance, the client device 108 can use the previously retrieved password rules for the associated application 104 or, alternatively, retrieve an updated set of password rules from the application 104.

The client device 108 can retrieve 320 one or more token tables based on the retrieved password rules. A token tables database 205 can contain several different token tables, and the token server 210 can use the retrieved password rules to retrieve token tables that map input values to tokens that satisfy the password rules. Thus, the password generator 215 can generate tokenized passwords by tokenizing the password seed using the retrieved token tables that satisfy the application's password rules. The client device 108 then generates 325 a tokenized password by querying the token tables with all or part of the password seed before transmitting 330 the tokenized password to the application 104.

In one embodiment, the password rules associated with an application 104 are not public. In such instances, the client device 108 can retrieve 320 low complexity token tables and generate 325 a tokenized password using these token tables. After the tokenized passwords have been generated 325, the client device 108 can attempt to register the tokenized password with the application 104. If the application 104 rejects the tokenized password as failing to satisfy the password rules of the application 104, the client device 108 can retrieve 320 higher complexity token tables and re-generate a new tokenized password. This process can continue until a tokenized password is generated that satisfies the application's password rules.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be tokenized to include one or more use rules such that the resulting tokenized data fails a validation test and is verifiable. Thus, while self aware tokenization and verifiable tokenization are described separately, aspects of each may be performed in concert, and the resulting tokenized data can be both self aware tokenized data and verifiable tokenized data.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating a tokenized password for a user account comprising:
    receiving, from a client device associated with a user, a password seed associated with the user account, the password seed based on a property of the client device;
    retrieving a set of password requirements from an application associated with the user account;
    selecting a token table from a set of token tables based on a value of a first portion of the password seed, the selected token table mapping, for input values of a set length, every possible input value to a unique token that satisfies every password requirement in the retrieved set of password requirements;
    tokenizing, by one or more hardware processors, a second portion of the password seed different from the first portion by querying the selected token table with a value of the second portion of the password seed to identify a token mapped to the value and replacing the second portion of the password seed with the identified token to generate a tokenized password; and
    responsive to generating the tokenized password, transmitting the tokenized password to the application associated with the user account without input from the user and without displaying the tokenized password to the user, the application configured to associate the tokenized password with the user account as a password of the user account, the application configured to request a password associated with the user account from the client device, the client device configured to tokenize a password input to produce a subsequent tokenized password using the selected token table and to provide the subsequent tokenized password to the application, and the application configured to compare the subsequent tokenized password received from the client device to the tokenized password to authenticate the client device.

2. The method of claim 1, wherein the one or more password requirements may be retrieved through an API configured to communicate with the application or from a user interface configured to allow a user to manually input password requirements.

3. The method of claim 1, further comprising: responsive to a determination that the tokenized password is not accepted by the application, accessing a second token table, the second token table mapping each of a plurality of input values to a different token, wherein the tokens of the second token table are, on average, more complex than the tokens of the token table; tokenizing the received password seed using the second token table to generate a second tokenized password; and transmitting the second tokenized password to the application associated with the user account.

4. The method of claim 1, wherein the accessed token table comprises an SLT token table.

5. The method of claim 1, wherein associating the tokenized password with the user account comprises replacing an existing password associated with the user account to the tokenized password.

6. The method of claim 1, wherein the property of the client device is invariant over time.

7. A system for generating a tokenized password for a user account comprising:
    a non-transitory computer-readable storage medium comprising executable computer instructions configured to:
        receive, from a client device associated with a user, a password seed associated with the user account, the password seed based on a property of the client device;
        retrieve a set of password requirements from an application associated with the user account;
        select a token table from a set of token tables based on a value of a first portion of the password seed, the selected token table mapping, for input values of a set length, every possible input value to a unique token that satisfies every password requirement in the retrieved set of password requirements;
        tokenize a second portion of the password seed different from the first portion by querying the selected token table with a value of the second portion of the password seed to identify a token mapped to the value and replacing the second portion of the password seed with the identified token to generate a tokenized password; and
        responsive to generating the tokenized password, transmitting the tokenized password to the application associated with the user account without input from the user and without displaying the tokenized password to the user, the application configured to associate the tokenized password with the user account as a password of the user account, the application configured to request a password associated with the user account from the client device, the client device configured to tokenize a password input to produce a subsequent tokenized password using the selected token table and to provide the subsequent tokenized password to the application, and the application configured to compare the subsequent tokenized password received from the client device to the tokenized password to authenticate the client device; and
    one or more hardware processors configured to execute the computer instructions.

8. The system of claim 7, wherein the received password seed associated with the user account comprises at least one of: a phrase, a password, a URL, a website, a user account, a user identity, a text string, a mnemonic device, a keyword, a short phrase, the name of a service, or an unrelated term.

9. The system of claim 7, wherein the one or more password requirements may be retrieved through an API configured to communicate with the application or from a user interface configured to allow a user to manually input password requirements.

10. The system of claim 7, further comprising computer instructions configured to: responsive to a determination that the tokenized password is not accepted by the application, accessing a second token table, the second token table mapping each of a plurality of input values to a different token, wherein the tokens of the second token table are, on average, more complex than the tokens of the token table; tokenizing the received password seed using the second token table to generate a second tokenized password; transmitting the second tokenized password to the application associated with the user account.

11. The system of claim 7, wherein the accessed token table comprises an SLT token table.

12. The system of claim 7, wherein associating the tokenized password with the user account comprises replacing an existing password associated with the user account to the tokenized password.

13. The system of claim 7, wherein the property of the client device is invariant over time.

14. A non-transitory computer-readable medium storing instructions for generating a tokenized password for a user account, wherein the instructions when executed by one or more computer processors cause the one or more processors to perform steps comprising:

receiving, from a client device associated with a user, a password seed associated with the user account, the password seed based on a property of the client device;

retrieving a set of password requirements from an application associated with the user account;

selecting a token table from a set of token tables based on a value of a first portion of the password seed, the selected token table mapping, for input values of a set length, every possible input value to a unique token that satisfies every password requirement in the retrieved set of password requirements;

tokenizing, by one or more hardware processors, a second portion of the password seed different from the first portion by querying the selected token table with a value of the second portion of the password seed to identify a token mapped to the value and replacing the second portion of the password seed with the identified token to generate a tokenized password; and responsive to generating the tokenized password, transmitting the tokenized password to the application associated with the user account without input from the user and without displaying the tokenized password to the user, the application configured to associate the tokenized password with the user account as a password of the user account, the application configured to request a password associated with the user account from the client device, the client device configured to tokenize a password input to produce a subsequent tokenized password using the selected token table and to provide the subsequent tokenized password to the application, and the application configured to compare the subsequent tokenized password received from the client device to the tokenized password to authenticate the client device.

15. The non-transitory computer-readable medium of claim 14, wherein the property of the client device is invariant over time.

* * * * *